United States Patent
Ko et al.

(10) Patent No.: US 9,351,019 B2
(45) Date of Patent: May 24, 2016

(54) SYSTEM FOR DETECTING VEHICLE DRIVING STATE

(71) Applicant: Automotive Research & Testing Center, Changhua County (TW)

(72) Inventors: Ming-Kuan Ko, Changhua (TW); Jia-Xiu Liu, Changhua County (TW)

(73) Assignee: Automotive Research & Testing Center (TW)

( * ) Notice: Subject to any disclaimer, the term of this patent is extended or adjusted under 35 U.S.C. 154(b) by 447 days.

(21) Appl. No.: 13/728,559

(22) Filed: Dec. 27, 2012

(65) Prior Publication Data

US 2014/0184797 A1    Jul. 3, 2014

(51) Int. Cl.
*H04N 7/18*      (2006.01)
*H04N 5/228*     (2006.01)
*G06F 7/00*      (2006.01)
*H04N 21/234*    (2011.01)
*G06K 9/00*      (2006.01)

(52) U.S. Cl.
CPC ...... *H04N 21/23418* (2013.01); *G06K 9/00845* (2013.01); *H04N 7/18* (2013.01)

(58) Field of Classification Search
None
See application file for complete search history.

(56) References Cited

U.S. PATENT DOCUMENTS

| | | | |
|---|---|---|---|
| 2004/0051293 A1* | 3/2004 | Go | 280/801.1 |
| 2004/0183663 A1* | 9/2004 | Shimakage | 340/436 |
| 2005/0073136 A1* | 4/2005 | Larsson | A61B 3/113 280/735 |
| 2009/0273687 A1* | 11/2009 | Tsukizawa et al. | 348/222.1 |

FOREIGN PATENT DOCUMENTS

| | | |
|---|---|---|
| CN | 101746269 A | 6/2010 |
| CN | 102054160 A | 5/2011 |
| CN | 102101438 A | 6/2011 |
| CN | 102509418 A | 6/2012 |
| DE | 102011011221 A1 | 7/2012 |
| JP | 06-262959 A | 9/1994 |
| JP | 10-272959 A | 10/1998 |

OTHER PUBLICATIONS

"Chinese Application Serial No. 201210333411.3, Search Report mailed May 21, 2015", (w/English Translation), 4 pgs.

* cited by examiner

*Primary Examiner* — Behrooz Senfi
*Assistant Examiner* — Maryam Nasri
(74) *Attorney, Agent, or Firm* — Schwegman, Lundberg & Woessner, P.A.

(57) ABSTRACT

A system is adapted for detecting a driving state of a vehicle, and is operable to obtain real-time image frames corresponding to a driver of the vehicle for determining if the driver is in a dangerous driving state, to obtain operation information of the vehicle for determining if the vehicle is being operated in a dangerous condition when the driver is unable to be identified by the system, and to provide a notification when the driving state of the vehicle is determined to be dangerous.

6 Claims, 2 Drawing Sheets

SYSTEM FOR DETECTING VEHICLE DRIVING STATE

BACKGROUND OF THE INVENTION

1. Field of the Invention

The invention relates to a detection system for a vehicle, and more particularly to a system for detecting a driving state of a vehicle.

2. Description of the Related Art

At present, there are various types of detection systems installed in a vehicle. Driving state detection systems may be classified into two major techniques: facial image detection and vehicle state detection.

In the case of facial image detection, a facial image of a driver is obtained for detecting changes in facial features, such as head movement, direction of view, eyes open or shut, etc., so as to determine concentration level of the driver. However, when the vehicle is in a tunnel, or is driven at night, facial detection may fail due to insufficient lighting. In addition, facial detection is not completely reliable due to facial differences among different drivers.

In the case of vehicle state detection, information associated with vehicle movement is obtained for determining if the vehicle is in a dangerous state. Compared to facial detection, it is advantageous in that the driving state is continuously monitored without being affected by ambient light, but is disadvantageous in that analysis must be performed under a high-speed driving condition. In addition, vehicle state detection is not completely reliable due to different driving behaviours among different drivers.

SUMMARY OF THE INVENTION

Therefore, an object of the present invention is to provide a system that may continuously detect a driving state of a vehicle with a relatively high reliability.

According to the present invention, a system for detecting a driving state of a vehicle comprises:

a driver monitoring unit to be disposed in the vehicle, and operable to obtain real-time image frames corresponding to a driver of the vehicle;

a vehicle monitoring unit operable to continuously obtain operation information of the vehicle and to provide at least one vehicle danger parameter; and a control unit coupled to the driver monitoring unit and the vehicle monitoring unit, and having a driver recognition condition, a driver danger condition, and a vehicle danger condition built therein, the control unit being operable to determine if the real-time image frames conform with the driver recognition condition, and including a notification module.

The control unit is further operable to determine if the real-time image frames conform with the driver danger condition when the control unit determines that the real-time image frames conform with the driver recognition condition, and the notification module is operable to provide a first notification signal when the control unit determines that the real-time image frames conform with the driver danger condition.

The control unit is further operable to determine if the vehicle danger parameter provided by the vehicle monitoring unit conforms with the vehicle danger condition when the control unit determines that the real-time image frames do not conform with the driver recognition condition, and the notification module is further operable to provide a second notification signal when the control unit determines that the vehicle danger parameter provided by the vehicle monitoring unit conforms with the vehicle danger condition.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
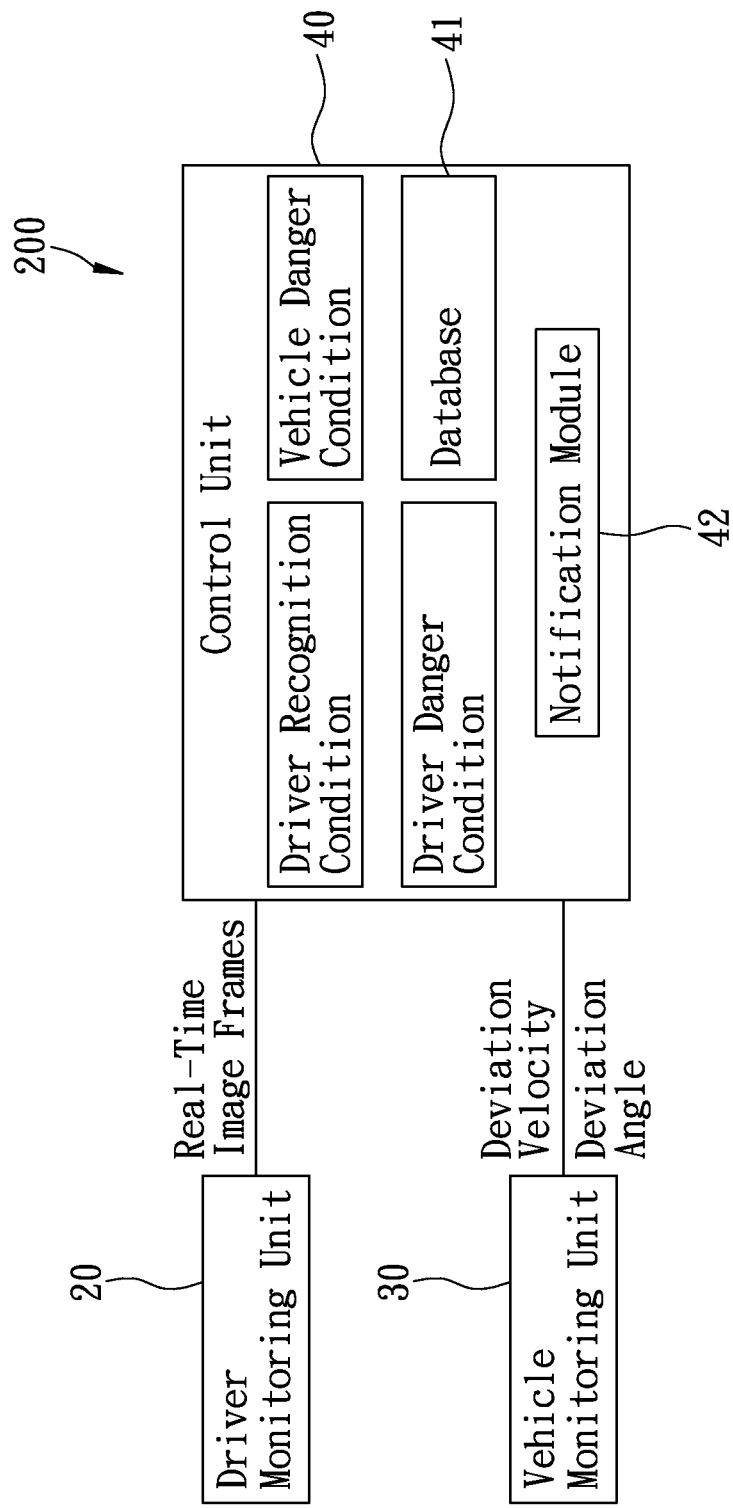
FIG. 1 is a block diagram showing a preferred embodiment of the system for detecting a driving state of a vehicle according to the present invention.
Figure 2:
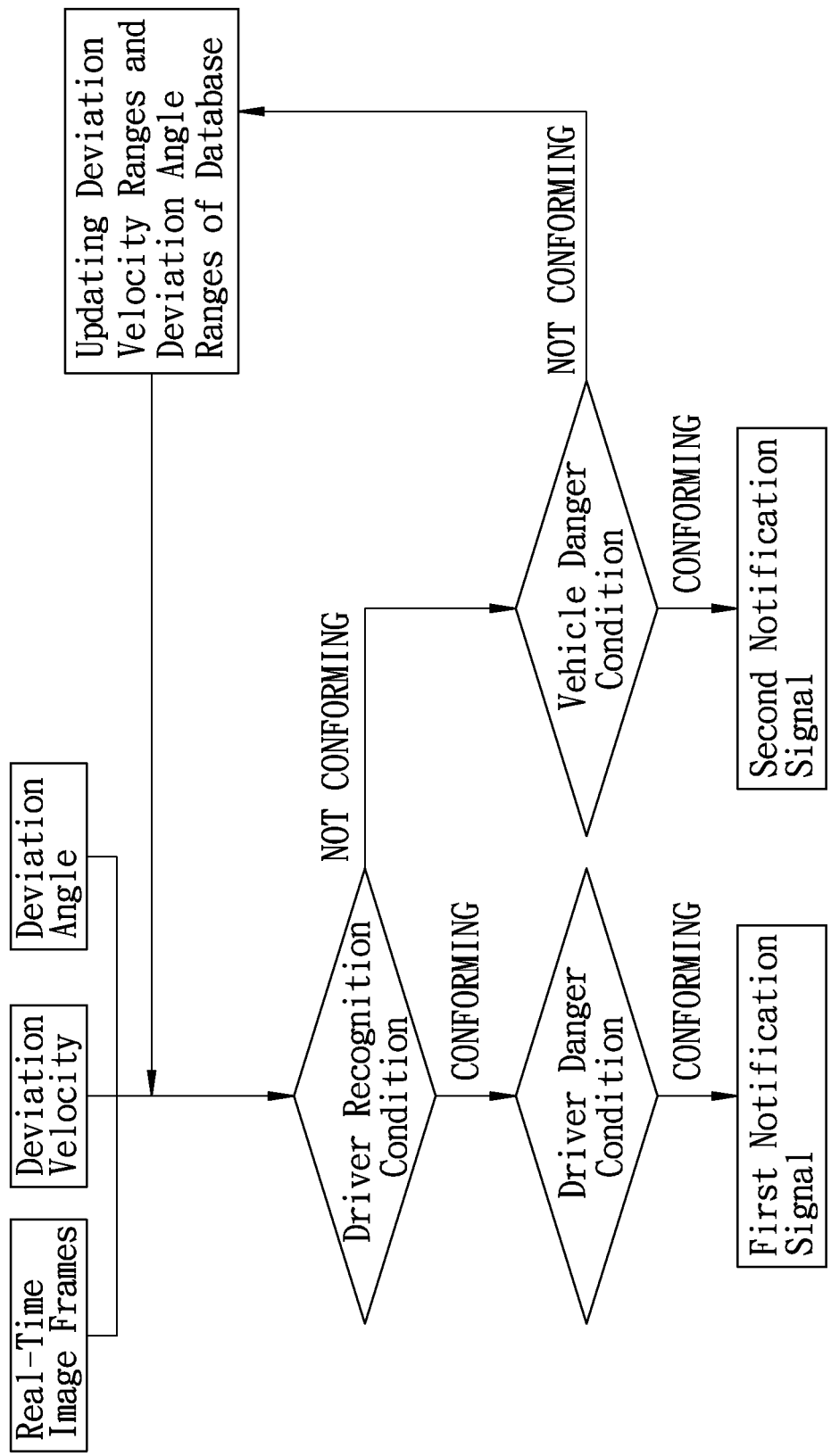
FIG. 2 is a flow chart illustrating steps performed by the preferred embodiment.

Referring to FIG. 1 and FIG. 2, the preferred embodiment of a system 200 according to this invention is adapted for detecting a driving state of a vehicle (not shown), and includes a driver monitoring unit 20, a vehicle monitoring unit 30, and a control unit 40.

The driver monitoring unit 20 is disposed in the vehicle, and is operable to obtain real-time image frames corresponding to a driver of the vehicle.

The vehicle monitoring unit 30 is operable to continuously obtain operation information of the vehicle and to provide at least one vehicle danger parameter. In this embodiment, the vehicle danger parameter includes a deviation velocity referring to an instantaneous velocity of the vehicle when movement of the vehicle deviates from a straight path, and a deviation angle referring to angular variation of the vehicle within a time period when movement of the vehicle deviates from the straight path. In this embodiment, the deviation velocity refers to an instantaneous angular velocity. It should be noted that, in practice, the straight path is adopted with reference to a center position without rotation of a steering wheel of the vehicle.

The control unit 40 is coupled to the driver monitoring unit 20 and the vehicle monitoring unit 30, and has a driver recognition condition, a driver danger condition, and a vehicle danger condition built therein. The control unit 40 includes a database 41 and a notification module 42.

The control unit 40 is operable to determine if the real-time image frames conform with the driver recognition condition, in this embodiment, based on facial feature of the driver in the real-time image frames obtained by the driver monitoring unit 20. In this embodiment, the facial feature includes a facial outline, and relative positions among eyes, a nose, and a mouth. The driver danger condition is associated with deviations of the facial outline, the eyes, the nose, and the mouth of the driver.

The database 41 is established with abnormality levels, deviation velocity ranges, and deviation angle ranges. Number of the abnormality levels is equal to a product of number of the deviation velocity ranges and number of the deviation angle ranges. Each of the abnormality levels corresponds to a combination of one of the deviation velocity ranges and one of the deviation angle ranges. The vehicle danger condition covers at least one of the abnormality levels. In this embodiment, the database 41 has four abnormality levels being 100, 75, 50, and 25, respectively, and the vehicle danger condition covers abnormality levels 100, 75, and 50. There are two deviation velocity ranges, which include that the deviation velocity is greater and not greater than 60 kph, respectively, and there are two deviation angle ranges, which include that the deviation angle is greater and not greater than 15 degrees, respectively. In this embodiment, the vehicle danger condition covers three abnormality levels, but may cover only one abnormality level in other embodiments. The content of the database 41 of this embodiment may be summarized as in the following table:

| | Vehicle danger condition Abnormality levels | | | |
|---|---|---|---|---|
| | 100 | 75 | 50 | 25 |
| Deviation velocity range | $V_D > 60$ kph | $V_D > 60$ kph | $V_D \leq 60$ kph | $V_D \leq 60$ kph |
| Deviation angle range | $\angle_D > 15°$ | $\angle_D \leq 15°$ | $\angle_D > 15°$ | $\angle_D \leq 15°$ | where $V_D$ represents the deviation velocity and $\angle_D$ represents the deviation angle.

The control unit 40 determines if the real-time image frames conform with the driver danger condition when the real-time image frames are determined to conform with the driver recognition condition. The notification module 42 is operable to provide a first notification signal to indicate that the driver may be distracted when the real-time image frames are determined to conform with the driver danger condition.

The control unit 40 further determines if the vehicle danger parameter provided by the vehicle monitoring unit 30 conforms with the vehicle danger condition when the real-time image frames are determined to not conform with the driver recognition condition. In this embodiment, the control unit 40 determines if the vehicle danger parameter provided by the vehicle monitoring unit 30 corresponds to one of the abnormality levels covered by the vehicle danger condition when the real-time image frames are determined to not conform with the driver recognition condition. The notification module 42 provides a second notification signal to indicate an abnormal operation when the vehicle danger parameter provided by the vehicle monitoring unit 30 is determined to correspond to one of the abnormality levels covered by the vehicle danger condition.

The driving state of the vehicle is determined to be normal when the real-time image frames do not conform with the driver danger condition and the vehicle danger parameter does not conform with the vehicle danger condition (i.e., the vehicle danger parameter does not correspond to any one of the abnormality levels covered by the vehicle danger condition). Then, the control unit 40 gathers statistics of the deviation velocity and the deviation angle provided by the vehicle monitoring unit 30 within a time period in which the driving state of the vehicle is normal. The control unit 40 uses the statistics gathered thereby for updating the deviation velocity ranges and the deviation angle ranges of the database 41. In this embodiment, the length of the time period is 10 minutes.

In this embodiment, the deviation velocity ranges initially use 60 kph as a boundary. When updating the database 41, the deviation velocity ranges are updated using a lower bound of top 10 percent and an upper bound of bottom 90 percent of the statistics of the deviation velocity gathered within the time period. As an example, there are 90 percent of the gathered deviation velocities being under 50 kph, and 10 percent of the gathered deviation velocities being over 50 kph. Then, the boundary of the deviation velocity ranges is updated to be 50 kph.

In this embodiment, the deviation angle ranges initially use 15 degrees as a boundary. The deviation angle ranges are updated using a lower bound of top 10 percent and an upper bound of bottom 90 percent of the statistics of the deviation angle gathered within the time period. As an example, there are 90 percent of the gathered deviation angles being smaller than 13 degrees, and 10 percent of the gathered deviation angles being greater than 13 degrees. Then, the boundary of the deviation angle ranges is updated to be 13 degrees.

Through a process of updating the database 41 as describes hereinabove, the control unit 40 learns driving behaviour of the driver, and the deviation velocity ranges and the deviation angle ranges are updated with the driving behaviour and the actual traffic condition, resulting in more precise determination of abnormal driving behaviour.

Therefore, even though the real-time image frames are distorted due to insufficient light in a tunnel or nighttime driving, the vehicle monitoring unit 30 can be operated to continuously detect the driving state of the vehicle. Moreover, through the combination of the deviation velocity and the deviation angle and the dynamic update of the database 41, the deviation velocity ranges and the deviation angle ranges may be adjusted with the driving behaviour, so as to be adaptive to different drivers and to achieve higher reliability for detecting the driving state of the vehicle.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A system for detecting a driving state of a vehicle, comprising:

a driver monitoring unit to be disposed in the vehicle, and operable to obtain real-time image frames corresponding to a driver of the vehicle;

a vehicle monitoring unit operable to continuously obtain operation information of the vehicle and to provide at least one vehicle danger parameter; and a control unit coupled to said driver monitoring unit and said vehicle monitoring unit, and having a driver recognition condition, a driver danger condition, and a vehicle danger condition built therein, said control unit being operable to determine if the real-time image frames conform with the driver recognition condition and including a notification module;

wherein, said control unit is operable to determine if the real-time image frames conform with the driver recognition condition based on a facial feature of the driver in the real-time image frames obtained by said driver monitoring unit, the facial feature including a facial outline, and relative positions among eyes, a nose, and a mouth;

wherein said control unit is further operable to determine if the real-time image frames conform with the driver danger condition when said control unit determines that the real-time image frames conform with the driver recognition condition, said notification module being operable to provide a first notification signal when said control unit determines that the real-time image frames conform with the driver danger condition;

wherein said control unit is further operable to switch from said driver monitoring unit to said vehicle monitoring unit to determine if the vehicle danger parameter provided by said vehicle monitoring unit conforms with the vehicle danger condition when said control unit determines that the real-time image frames do not conform with the driver recognition condition, receiving data from said notification module being further operable to provide a second notification signal when said control unit determines that the vehicle danger parameter provided by said vehicle monitoring unit conforms with the vehicle danger condition;

wherein said control unit determines that the real-time image frames do not conform with the driver recognition condition when the real-time image frames are distorted due to one of insufficient light and nighttime driving.

2. The system as claimed in claim 1, wherein the vehicle danger parameter includes a deviation velocity referring to an instantaneous velocity of the vehicle when movement of the vehicle deviates from a straight path, and a deviation angle referring to angular variation of the vehicle within a time period when movement of the vehicle deviates from the straight path.

3. The system as claimed in claim 1, wherein said control unit includes a database established with abnormality levels, deviation velocity ranges, and deviation angle ranges, number of the abnormality levels being equal to a product of number of the deviation velocity ranges and number of the deviation angle ranges, each of the abnormality levels corresponding to a combination of one of the deviation velocity ranges and one of the deviation angle ranges, the vehicle danger condition covering at least one of the abnormality levels, said control unit being operable to determine if the vehicle danger parameter provided by said vehicle monitoring unit corresponds to one of the abnormality levels covered by the vehicle danger condition when said control unit determines that the real-time image frames do not conform with the driver recognition condition.

4. The system as claimed in claim 3, wherein said control unit is further operable to gather statistics of the deviation velocity and the deviation angle provided by said vehicle monitoring unit within a time period, the time period being one in which the real-time image frames do not conform with the driver danger condition and the vehicle danger parameter does not correspond to any one of the abnormality levels covered by the vehicle danger condition, said control unit being further operable to use the statistics gathered thereby for updating the deviation velocity ranges and the deviation angle ranges of said database.

5. The system as claimed in claim 4, wherein the deviation velocity ranges are updated using a lower bound of top 10 percent and an upper bound of bottom 90 percent of the statistics of the deviation velocity gathered within the time period, and the deviation angle ranges are updated using a lower bound of top 10 percent and an upper bound of bottom 90 percent of the statistics of the deviation angle gathered within the time period.

6. The system as claimed in claim 3, wherein one of the deviation velocity ranges includes deviation velocities greater than 60 kph, and another one of the deviation velocity ranges includes velocities not greater than 60 kph;

wherein one of the deviation angle ranges includes deviation angles greater than 15 degrees, and another one of the deviation angle ranges includes deviation angles not greater than 15 degrees.

* * * * *